(12) United States Patent
Shiokawa

(10) Patent No.: US 9,348,124 B2
(45) Date of Patent: May 24, 2016

(54) PROJECTION SYSTEM AND PROJECTION-TYPE IMAGE DISPLAY APPARATUS

(71) Applicant: SEIKO EPSON CORPORATION, Tokyo (JP)

(72) Inventor: Koji Shiokawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/595,971

(22) Filed: Jan. 13, 2015

(65) Prior Publication Data

US 2015/0205082 A1  Jul. 23, 2015

(30) Foreign Application Priority Data

Jan. 17, 2014  (JP) ................................. 2014-006457

(51) Int. Cl.
| | | |
|---|---|---|
| *G02B 9/00* | (2006.01) | |
| *G02B 15/14* | (2006.01) | |
| *G02B 15/167* | (2006.01) | |
| *G02B 13/16* | (2006.01) | |
| *G03B 21/14* | (2006.01) | |
| *G02B 15/20* | (2006.01) | |
| *G02B 15/16* | (2006.01) | |

(52) U.S. Cl.
CPC .............. *G02B 15/167* (2013.01); *G02B 13/16* (2013.01); *G02B 15/14* (2013.01); *G02B 15/16* (2013.01); *G02B 15/161* (2013.01); *G02B 15/20* (2013.01); *G03B 21/142* (2013.01)

(58) Field of Classification Search
CPC ........ G02B 13/16; G02B 15/14; G02B 15/16; G02B 15/20
USPC .................... 359/649, 676, 682, 683
See application file for complete search history.

(56) References Cited

U.S. PATENT DOCUMENTS

| | | |
|---|---|---|
| 2007/0279762 A1 | 12/2007 | Tomioka |
| 2008/0158694 A1 | 7/2008 | Ohno |
| 2008/0231962 A1* | 9/2008 | Yamada ............... G02B 15/177 359/649 |

FOREIGN PATENT DOCUMENTS

| | | |
|---|---|---|
| JP | 2007-157097 A | 6/2007 |
| JP | 2007-328006 A | 12/2007 |
| JP | 2008-164997 A | 7/2008 |
| JP | 2009-237400 A | 10/2009 |
| JP | 4919394 B2 | 4/2012 |
| JP | 5101878 B2 | 12/2012 |

* cited by examiner

*Primary Examiner* — William Choi
(74) *Attorney, Agent, or Firm* — Oliff PLC

(57) ABSTRACT

A projection lens is a zoom lens and formed of a first group to an N-th group sequentially arranged from an image enlargement side (that is, screen side), where N is 6 or 7. The first group includes a first A group and a first B group sequentially arranged from the image enlargement side. The first A group is formed of two positive lenses, and the first B group is formed of a cemented lens formed of a positive lens and a negative lens. The second group includes at least two negative lenses. In magnification changing action, at least the first group and the N-th group are fixed, and at least the third group to the (N−1)-th group are moved along an optical axis. In focusing action, the first A group on the image enlargement side in the first group is solely moved along the optical axis.

12 Claims, 7 Drawing Sheets

PROJECTION SYSTEM AND PROJECTION-TYPE IMAGE DISPLAY APPARATUS

BACKGROUND

1. Technical Field

The present invention relates to a projection system suitable to be incorporated into a projector that enlarges and projects an image formed on an image display device, and also relates to a projection-type image display apparatus into which the projection system is incorporated.

2. Related Art

In recent years, as the luminance and resolution of a projector are increased, a projector can be installed at a wider range of locations, and there is an increasing demand for installation of a projector at a location relatively apart from a screen. To meet the demand, it is necessary to provide a long-focus zoom lens that not only performs projection over a relatively long distance from the screen to meet a specific screen size but also achieves high resolution.

That is, as the luminance of a projector is increased, the projector is increasingly used in an application in which the projector itself is installed at a location apart from a screen. A zoom lens having a long focal length and a large f-number and providing high resolution is required as a projection lens accordingly.

As a typical projection system, there is a retro-focus projection system in which a first group closest to a screen has negative power. Using such a projection system to form a long-focus system undesirably results in a large diameter of the entrance pupil. To achieve a large diameter of the entrance pupil, the diameters of the lenses in a second group and the following groups undesirably increase due to on-axis light rays. As a result, it is difficult to ensure high performance. Further, the diameter of a mechanism in a projector body increases and the diameters of the lenses increase, resulting in an increase in cost.

On the other hand, there are long-focus zoom lenses used as an imaging system (see JP-A-2007-157097, JP-A-2009-237400, and JP-A-2008-164997).

For example, using the imaging system described in JP-A-2007-157097 as a projection system increases the size of a front lens, the overall length of the projection system, and the diameter of an aspheric lens, resulting in a difficulty in manufacturing, an increase in cost, and other problems. To avoid the problems, optical system design adapted to a projection application is required.

SUMMARY

An advantage of some aspects of the invention is to provide a long focus zooming projection system that not only prevents an increase in size of a lens facing a screen, that is, on the image enlargement side but also is relatively compact as a whole lens system and provides high performance.

A projection system according to an aspect of the invention is a projection system including a first group to an N-th group sequentially provided from an image enlargement side, and N is 6 or 7. The first group is formed of a first A group formed of two or three positive lenses and a first B group formed of a cemented lens formed of a positive lens and a negative lens and provided in a position adjacent to the second group. The second group includes at least two negative lenses. In focusing action, the first A group is moved along an optical axis, and in magnification changing action, at least the first group and the N-th group are fixed and at least the third group to the (N−1)-th group are moved along the optical axis.

The projection system described above, in which the first group is formed of the first A group, which is formed of two or three positive lenses, and the first B group, which is formed of a cemented lens formed of a positive lens and a negative lens, can sufficiently correct spherical aberrations, which are typical of a long-focus lens when operating in a telephoto side setting. Further, dividing the first group into the first A group and the first B group and using the first A group on the image enlargement side in the first group as a focusing group in focusing action allows reduction in the amount of lens movement in focusing action and simplification of a focusing mechanism. The division further allows a lightweight moving unit, which improves the reliability of the focusing mechanism. Moreover, configuring the projection system to be formed of six or seven groups in total and moving the third group to the (N−1)-th group in magnification changing action can suppress variation in aberrations produced when a wide-angle end setting is changed to a telephoto end setting and vice versa. Configuring the second group to be formed of at least two negative lenses allows a sufficient amount of peripheral light to be ensured and a sufficient back focal distance necessary for the projection system or a projection lens to be ensured.

According to another aspect of the invention, in the magnification changing action, the second group to the (N−1)-th group are moved along the optical axis.

According to still another aspect of the invention, in the magnification changing action, the first group, the second group, and the N-th group are fixed.

According to yet another aspect of the invention, assuming about the lenses in the first group that the positive lens of the cemented lens present in the first B group has an Abbe number vd1 and the negative lens of the cemented lens has an Abbe number vd2, the following conditional expression (1) is satisfied.

$$25<(vd1-vd2)<50 \qquad (1)$$

The conditional expression (1) described above defines the relationship between the Abbe numbers of the lenses of the cemented lens in the first B group. Setting the Abbe numbers to fall within the range defined by the conditional expression (1) described above allows correction of an axial chromatic aberration produced on the telephoto side.

According to still yet another aspect of the invention, assuming that the second group includes a plurality of negative lenses including the two negative lenses; one of the plurality of negative lenses is a biconcave lens; and among the plurality of negative lenses present in the second group, the negative lens located in a position closest to the image enlargement side has an Abbe number vd, the following conditional expression (2) is satisfied.

$$25<vd<50 \qquad (2)$$

The conditional expression (2) described above defines the Abbe number of the negative lens disposed in a position closest to the image enlargement side. Setting the Abbe number to fall within the range defined by the conditional expression (2) described above allows variation in chromatic aberrations resulting from magnification change from the wide-angle end to the telephoto end to be suppressed.

According to further another aspect of the invention, assuming that the focal length of the combination of the first A group and the first B group is f1 and the focal length of the second group is f2, the following conditional expression (3) is satisfied.

$$1.5 < |f1/f2| < 4 \quad (3)$$

The conditional expression (3) described above defines the relationship between the focal length of the combination of the first A group and the first B group and the focal length of the second group. Setting the focal lengths to fall within the range defined by the conditional expression (3) described above allows the absolute values of the refracting power of the first group and the refracting power of the second group to be nearly equal to each other, whereby spherical aberrations produced at the wide-angle end can be corrected and an increase in size of a lens in the vicinity of an aperture can be suppressed.

According to still further another aspect of the invention, the projection system further includes a lens having substantially no refracting power.

A projection-type image display apparatus according to yet further another aspect of the invention includes any of the projection systems described above and an image forming optical section provided in an optical path of the projection system in a position upstream thereof.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projection system according to an embodiment of the invention and a projection-type image display apparatus into which the projection system is incorporated will be described below in detail with reference to the drawings.

Figure 1:
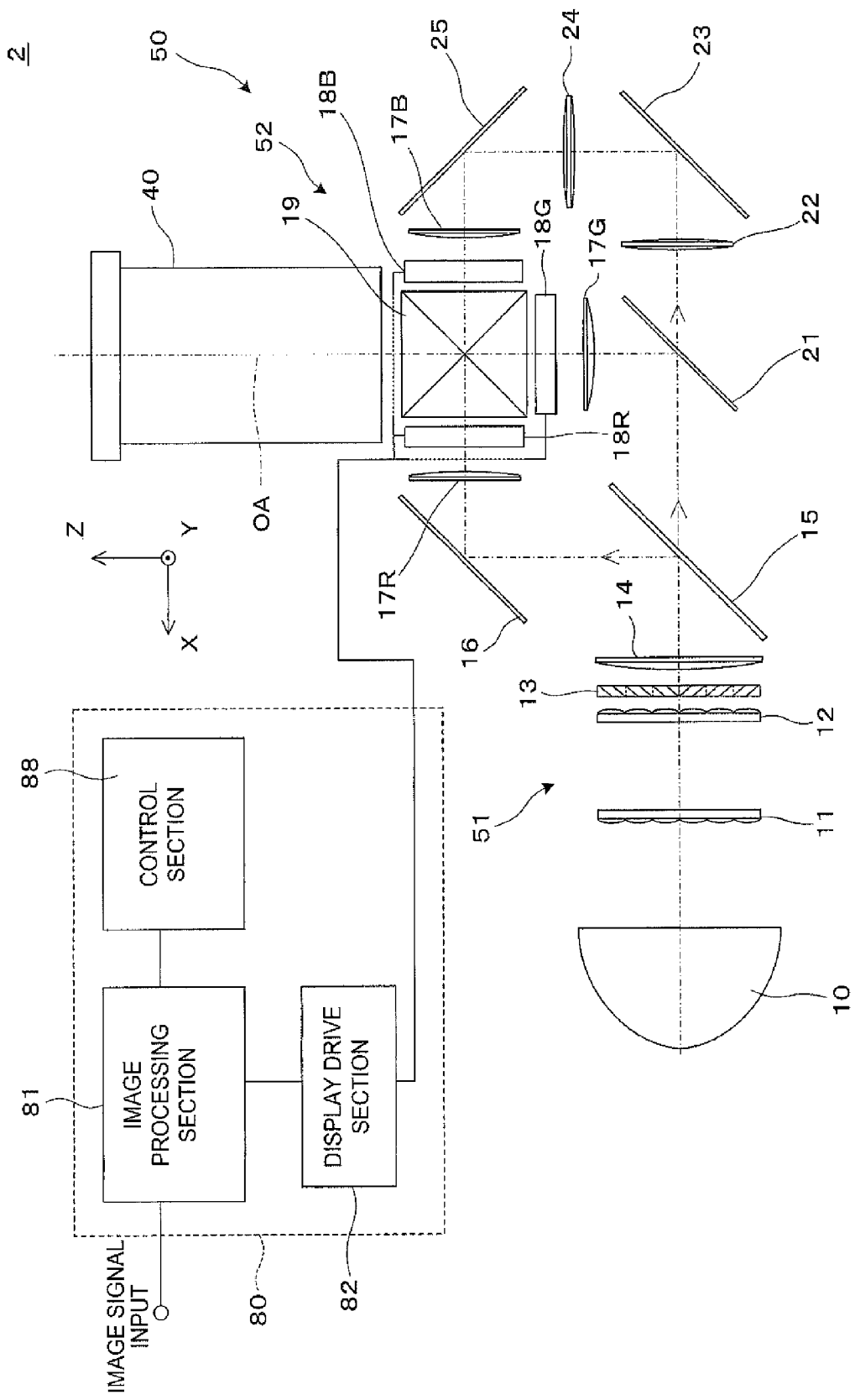
FIG. 1 shows a schematic configuration of a projection-type image display apparatus into which a projection system according to an embodiment is incorporated.

A projector 2 as a projection-type image display apparatus into which a projection system according to an embodiment of the invention is incorporated includes an optical system unit 50, which projects image light, and a circuit apparatus 80, which controls the action of the optical system unit 50, as shown in FIG. 1.

In the optical system unit 50, a light source 10 is formed, for example, of an ultrahigh-pressure mercury lamp or a solid-state light source. A first optical integration lens 11 and a second optical integration lens 12 each have a plurality of lens elements arranged in an array. The first optical integration lens 11 divides a light flux from the light source 10 into a plurality of light fluxes. Each of the lens elements in the first optical integration lens 11 focuses the light flux from the light source 10 into a light spot in a position in the vicinity of a corresponding lens element in the second optical integration lens 12. The lens elements in the second optical integration lens 12 cooperate with a superimposing lens 14 to form images of the lens elements in the first optical integration lens 11 on liquid crystal panels 18R, 18G, and 18B, which will be described later.

A polarization conversion element 13 converts light from the second optical integration lens 12 into predetermined linearly polarized light. The superimposing lens 14 superimposes the images of the lens elements in the first optical integration lens 11 on each other via the second optical integration lens 12 on a display area of each of the liquid crystal panels 18R, 18G, and 183.

A first dichroic mirror 15 reflects R light incident through the superimposing lens 14 and transmits G light and B light. The R light reflected off the first dichroic mirror 15 travels via a reflection mirror 16 and a field lens 17R and enters the liquid crystal panel 18R, which is a light modulation device or a display device. The liquid crystal panel 18R modulates the R light in accordance with an image signal to form an R image.

A second dichroic mirror 21 reflects the G light from the first dichroic mirror 15 and transmits the B light therefrom. The G light reflected off the second dichroic mirror 21 travels via a field lens 17G and enters the liquid crystal panel 18G, which is a display device. The liquid crystal panel 18G modulates the G light in accordance with an image signal to form a G image. The B light having passed through the second dichroic mirror 21 travels via a relay lens 22, a reflection mirror 23, a relay lens 24, a reflection mirror 25, and a field lens 17B and enters the liquid crystal panel 183, which is a display device. The liquid crystal panel 18B modulates the B light in accordance with an image signal to form a B image.

A cross dichroic prism 19 is a light combining prism and combines the light fluxes modulated by the liquid crystal panels 18R, 18G, and 18B into image light and directs the image light toward a projection lens 40.

The projection lens 40 enlarges and projects the image light having undergone the modulation process in the liquid crystal panels 18G, 18R, and 18B and the combination process in the cross dichroic prism 19 onto a screen (not shown).

In the optical system unit 50 described above, the cross dichroic prism 19 and the projection lens 40 form a projection system 52 for enlarging and projecting images formed by the liquid crystal panels 18R, 18G, and 18B onto the screen. The projection lens 40 alone can function as the projection system 52 and is therefore called a projection system 52 in some cases. The liquid crystal panels 18G, 18R, and 18B, the dichroic mirrors 15 and 21, the polarization conversion element 13, the optical integration lenses 11 and 12, the light source 10, and other components that are provided in an upstream portion along the optical path of the thus configured projection system 52 function as an image forming optical section 51.

The circuit apparatus 80 includes an image processing section 81, to which an external image signal, such as a video signal, is inputted, a display drive section 82, which drives the liquid crystal panels 18G, 18R, and 18B provided in the optical system unit 50 based on an output from the image processing section 81, and a main control section 88, which oversees and controls the action of the image processing section 81 and the display drive section 82.

The image processing section 81 converts the inputted external image signal into image signals containing grayscales and other parameters associated with the respective colors. The image processing section 81 can also perform a variety of types of image processing, such as distortion correction and color correction, on the external image signal.

The display drive section 82 can cause the liquid crystal panels 18G, 18R, and 18B to operate based on the image signals outputted from the image processing section 81 in such a way that the liquid crystal panels 18G, 18R, and 18B form images corresponding to the image signals or images corresponding to image signals having undergone image processing.

A specific description will be made of the projection lens 40 and the projection system 52 according to the embodiment of the invention with reference to FIG. 2. The projection lens 40 shown by way of example as the embodiment has the same configuration as that of a projection lens in Example 1, which will be described later.

The projection lens 40 according to the embodiment is a zoom lens and formed, for example, of a first group G1 to a sixth group G6 sequentially arranged from an image enlargement side (that is, screen side). The first group G1 to the sixth group G6 are also referred to as a first lens group G1 to a sixth lens group G6. In magnification changing action, among the first group G1 to the sixth group G6, the first group G1, which is closest to the image enlargement side, and the sixth group G6, which is closest to an image reduction side, are fixed, and the second group G2 to the fifth group G5 between the first group G1 and the sixth group G6 are individually moved along an optical axis OA. In focusing action, among groups in the first group G1, a first A group G1-1, which is located on the image enlargement side, is solely moved along the optical axis OA. The projection lens 40 is not necessarily formed of the first group G1 to the sixth group G6 and can be formed of a first group to a seventh group (first lens group to seventh lens group). In this case, the seventh group, which is the last group on the image reduction side, is fixed in magnification changing action, as in the case described above.

The first group G1 of the projection lens 40 includes the first A group G1-1 and a first B group G1-2 sequentially arranged from the image enlargement side. The first A group G1-1 is formed of two positive lenses, and the first B group G1-2 is formed of a cemented lens formed of a positive lens and a negative lens. Specifically, the first A group G1-1 includes a positive first lens L1 and a positive second lens L2 sequentially arranged from the image enlargement side, and the first B group G1-2 includes a positive third lens L3 and a negative fourth lens L4 sequentially arranged from the image enlargement side with the lenses L3 and L4 cemented to each other.

The second group G2 includes at least two negative lenses. Specifically, the second group G2 includes a negative fifth lens L5 and a negative sixth lens L6 sequentially arranged from the image enlargement side. The second group G2 instead includes in some cases not only the two negative lenses described above but also an additional positive lens or any other lens on the image reduction side. In magnification changing action, the second group G2 is moved independently of the first group G1 in principle but may instead be fixed to the first B group G1-2.

The third group G3, for example, includes, but not necessarily, a positive seventh lens L7. The fourth group G4 is formed, for example, of a positive eighth lens L8, a cemented lens formed of a positive lens L9 and a negative lens L10, and a positive eleventh lens L11 but is not necessarily configured as described above, and the positive eighth lens L8, for example, may be omitted. Further, an additional lens group can be provided in a position between the third group G3 and the fourth group G4 with the fourth group G4 to the sixth group G6 instead called a fifth group to a seventh group. The fifth group G5, for example, includes, but not necessarily, a negative twelfth lens L12 and a positive thirteenth lens L13.

The sixth group G6 is the last group in the present embodiment and is formed of, but not necessarily, a positive fourteenth lens L14.

The projection lens 40 or the projection system 52 described above, in which the first group G1 on the image enlargement side is formed of the first A group G1-1, which is formed of the positive first lens L1 and the positive second lens L2, and the first B group G1-2, which is formed of the cemented lens formed of the positive lens L3 and the negative lens L4, can sufficiently correct spherical aberrations, which are typical of a long-focus lens when operating in a telephoto side setting. Further, using the first A group G1-1 on the image enlargement side in the first group G1 as a focusing group allows use of a simple focusing mechanism, and configuring the projection lens 40 to be formed of N groups (six or seven groups in total) and moving at least the third group to the (N−1)-th group in magnification changing action can suppress variation in aberrations produced when a wide-angle end setting is changed to a telephoto end setting and vice versa. Configuring the second group G2 to be formed of two negative lenses, that is, the negative fifth lens L5 and the negative sixth lens L6 allows a sufficient amount of peripheral light to be ensured and a sufficient back focal distance necessary for the projection lens 40 and the projection system 52 to be ensured.

The projection lens 40 satisfies the conditional expression (1), which has been already described. That is, in the first group G1, assuming that the positive third lens L3, which is one of the lenses L3 and L4 that forms the cemented lens provided in the first B group G1-2, has an Abbe number vd1 and the negative fourth lens L4, which is the other one of the lenses L3 and L4, has an Abbe number vd2, the following conditional expression (1) is satisfied.

$$25<(vd1-vd2)<50 \tag{1}$$

In addition to the conditional expression (1) described above, the projection lens 40 satisfies the conditional expression (2) and other conditional expressions, which have been already described. That is, assuming that the fifth lens L5, which is one of the plurality of negative lenses provided in the second group G2, is a biconcave lens, and that the fifth lens L5, which is one of the plurality of negative lenses provided in the second group G2 and located in a position closest to the image enlargement side, has an Abbe number vd, the following conditional expression (2) is satisfied.

$$25<vd<50 \tag{2}$$

In addition to the conditional expression (1) and other conditional expressions described above, the projection lens 40 satisfies the conditional expression (3), which has been already described. That is, assuming that the focal length of the combination of the first A group G1-1 and the first B group G1-2 is f1 and the focal length of the second group G-2 is f2, the following conditional expression (3) is satisfied.

$$1.5<|f1/f2|<4 \tag{3}$$

The projection lens 40 according to the embodiment may further include a lens having substantially no power.

EXAMPLES

A description will be made of specific examples of the projection lens 40 (or projection system 52) below. The meanings of specification values common to Examples 1 to 3 are summarized as follows.

R: Radius of curvature d: On-axis inter-surface distance (mm) (lens thickness or inter-lens distance)

nd: Refractive index at d line

μd: Abbe number at d line f: Focal length of lens

FNO: f-number

OBJ: Distance to object

A to G: Inter-group distance (variable on-axis inter-surface distance d)

SC: Screen surface

L1 to L16: Lens

DP: Component inserted in downstream position (such as prism)

PA: Image formation surface I of display device

Example 1

Table 1 below shows data on lens surfaces that form a projection lens in Example 1. In Table 1 and other tables, "SURFACE NUMBER" means the number of a surface of the lens, "LENS" means the number of the lens, and "GROUP" means the lens group to which the lens belongs. In the tables, for example, "L3/4" means a cemented lens formed of the third lens L3 and the fourth lens L4. Further, "INFINITY" means infinite distance.

TABLE 1

| SURFACE No. | LENS | GROUP | R | d | nd | μd |
|---|---|---|---|---|---|---|
| SC | | | INFINITY | OBJ | | |
| 1 | L1 | 1-1G | 188.35 | 10.16 | 1.8467 | 23.8 |
| 2 | | | −3630.92 | 15.80 | | |
| 3 | L2 | 1-1G | 77.50 | 10.32 | 1.4875 | 70.5 |
| 4 | | | 221.73 | A | | |
| 5 | L3/4 | 1-2G | 146.94 | 9.46 | 1.4875 | 70.5 |
| 6 | | | −322.32 | 3.20 | 1.5481 | 45.8 |
| 7 | | | 68.65 | B | | |
| 8 | L5 | 2G | −395.12 | 2.40 | 1.6727 | 32.2 |
| 9 | | | 89.88 | 20.93 | | |
| 10 | L6 | 2G | −124.23 | 2.80 | 1.7847 | 25.7 |
| 11 | | | −349.58 | C | | |
| 12 | L7 | 3G | 143.55 | 9.45 | 1.7410 | 52.6 |
| 13 | | | −178.30 | D | | |
| 14 | L8 | 4G | 169.34 | 5.80 | 1.7130 | 53.9 |
| 15 | | | −1060.92 | 0.20 | | |
| 16 | L9/10 | 4G | 100.06 | 10.57 | 1.4875 | 70.5 |
| 17 | | | −113.68 | 2.40 | 1.6727 | 32.2 |
| 18 | | | 42.60 | 4.98 | | |
| 19 | L11 | 4G | 43.58 | 14.57 | 1.7725 | 49.6 |
| 20 | | | 146.55 | E | | |
| 21 | L12 | 5G | −221.51 | 2.30 | 1.6034 | 38.0 |
| 22 | | | 51.10 | 45.27 | | |
| 23 | L13 | 5G | −81.96 | 5.27 | 1.5317 | 48.8 |
| 24 | | | −57.00 | F | | |
| 25 | L14 | 6G | 88.17 | 7.14 | 1.8467 | 23.8 |
| 26 | | | 7446.86 | 5.00 | | |
| 27 | DP | | INFINITY | 40 | 1.5168 | 64.2 |
| 28 | | | INFINITY | 26.02 | | |
| PA | | | INFINITY | 0 | | |

Table 2 below shows zoom data for describing magnification changing action of the projection lens in Example 1. Table 2 shows the focal length f, the f-number FNO, the inter-group distances A to F, and other parameters of the projection lens in Example 1 that operates in a wide-angle end "WIDE" setting and a telephoto end "TELE" setting.

TABLE 2

| PARAMETER | WIDE | TELE |
|---|---|---|
| f | 149.2 | 209.1 |
| FNO | 1.84 | 2.38 |
| OBJ | 18 m | |
| EFFECTIVE IMAGE CIRCLE DIAMETER | φ39 | |
| ω (HALF ANGLE OF VIEW) | 7.4 | 5.3 |
| A | 2.41 | 2.41 |
| B | 13.78 | 11.80 |
| C | 40.29 | 1.00 |
| D | 1.00 | 22.83 |
| E | 5.92 | 7.42 |
| F | 0.80 | 18.74 |

Table 3 below shows data for describing focusing action of the projection lens in Example 1. Table 3 shows how the inter-group distance A, which represents the position of the first A group G1-1, changes when the distance to an object OBJ is changed from 6 m to infinity. The movement range in Table 3 corresponds to the amount of movement of the first A group G1-1 necessary for focusing over the range described above.

TABLE 3

| OBJ | A |
|---|---|
| 6 m | 3.96 |
| 18 m | 2.4073 |
| INF | 1.645 |
| MOVEMENT RANGE | 2.315 |

Figure 2:
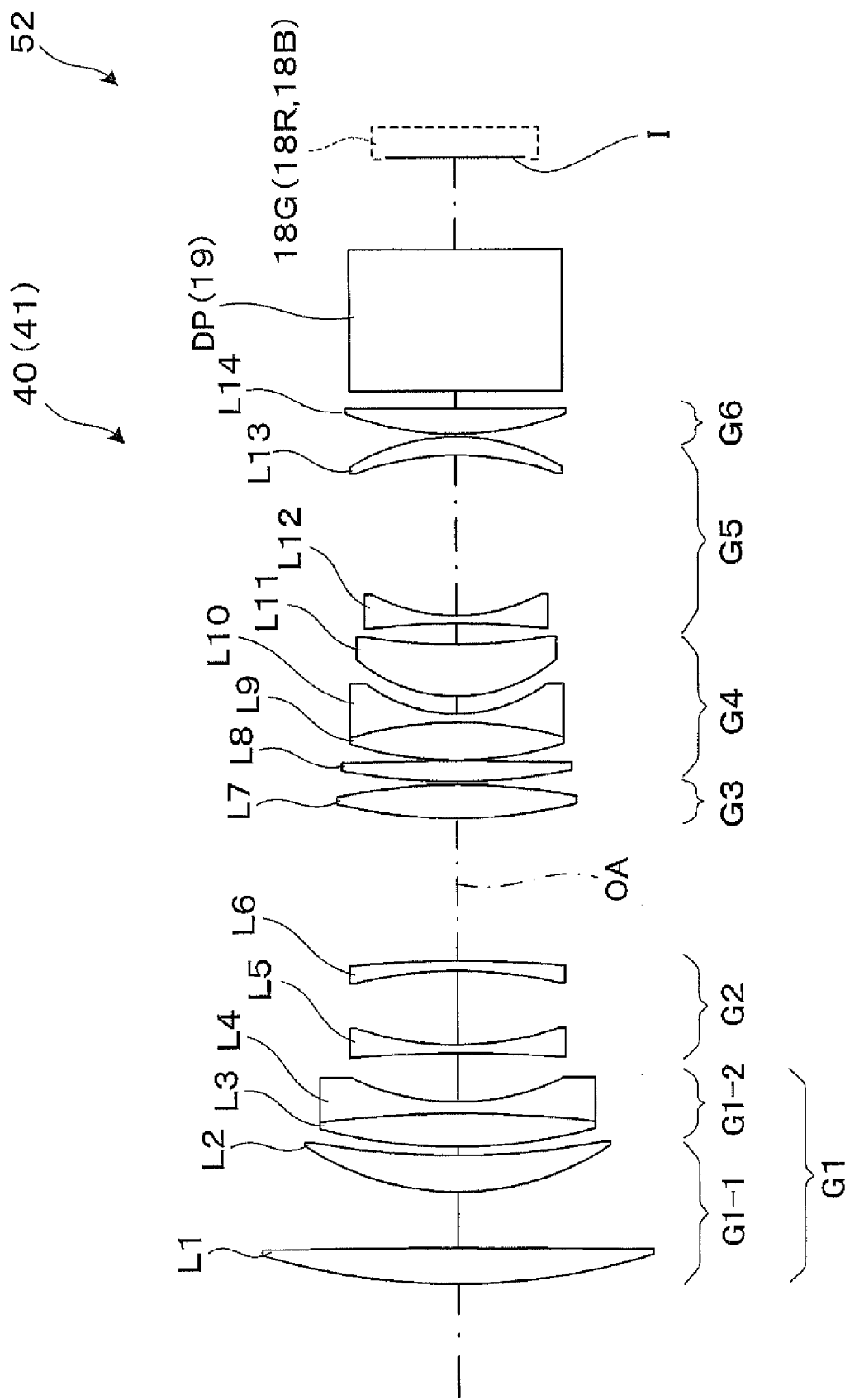
FIG. 2 is a cross-sectional view of a projection system in Example 1.

FIG. 2 is a cross-sectional view of the projection system including the projection lens and other components in Example 1. A projection lens 41 (or projection system 52) shown in FIG. 2 is formed of a first group G1 to a sixth group G6 sequentially arranged from the image enlargement side. Among the groups, the first group G1 includes a first A group G1-1 and a first B group G1-2 sequentially arranged from the image enlargement side. The first A group G1-1 includes a positive first lens L1 and a positive meniscus second lens L2, and the first B group G1-2 is a cemented lens formed of a positive third lens L3 and a negative fourth lens L4 cemented to each other. The second group G2 includes a negative fifth lens L5 and a negative meniscus sixth lens L6. The third group G3, for example, includes a positive seventh lens L7. The fourth group G4, for example, includes a positive eighth lens L8, a cemented lens formed of a positive ninth lens L9 and a negative tenth lens L10, and a positive meniscus eleventh lens L11. The fifth group G5, for example, includes a negative twelfth lens L12 and a positive meniscus thirteenth lens L13. The sixth group G6, which is closest to the image reduction side, includes a nearly plano-convex, positive fourteenth lens L14. In magnification changing action, the second group G2 to the fifth group G5 are individually moved along the optical axis OA, and in focusing action, the first A group G1-1 on the image enlargement side is moved along the optical axis OA.

Figure 3A:
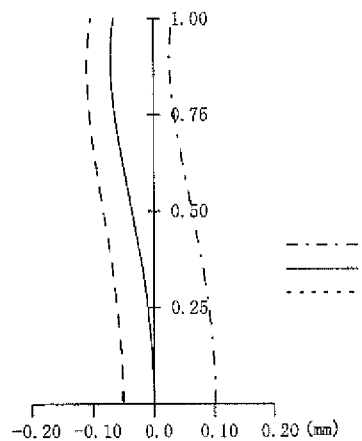
FIGS. 3A to 3F are aberration diagrams of the projection system in Example 1.
Figure 3B:
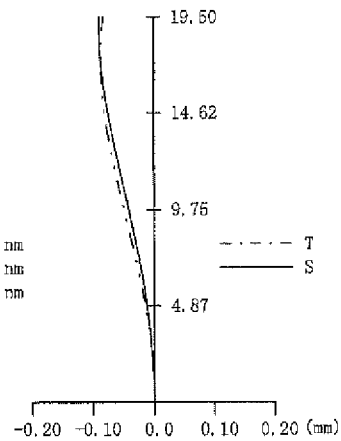
Figure 3C:
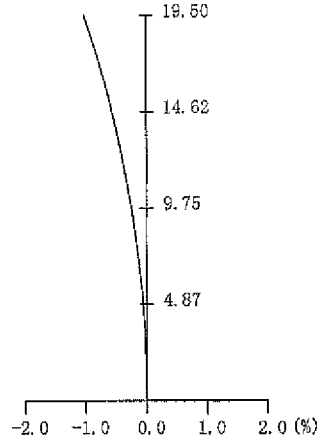
Figure 3D:
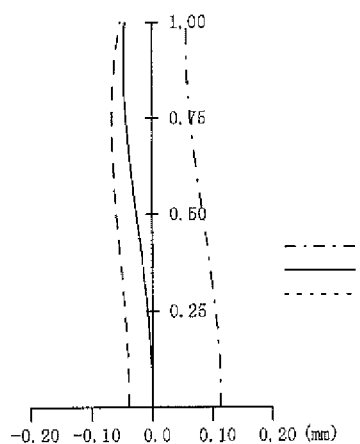
Figure 3E:
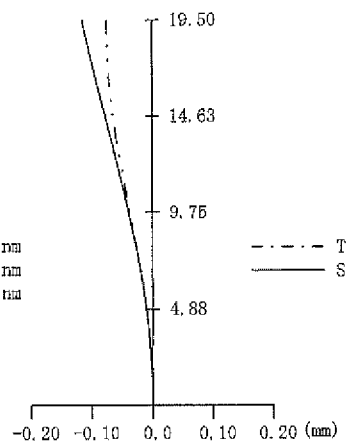
Figure 3F:
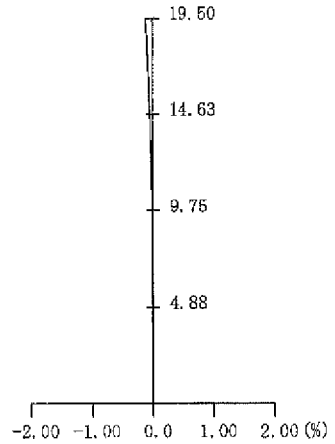

FIGS. 3A to 3C are aberration diagrams (spherical aberration, astigmatism, and distortion) at the wide-angle end (WIDE) of the projection lens 41 in Example 1, and FIGS. 3D to 3F are aberration diagrams (spherical aberration, astigmatism, and distortion) at the telephoto end (TELE) of the projection lens 41 in Example 1. The aberrations in FIGS. 3A to 3F are those produced when the distance to an object OBJ is 6 m.

Table 4 below shows numerical values (combined focal length) associated with the conditional expression (3) for the projection lens 41 in Example 1.

TABLE 4

| DEFINITION | CORRESONDING ELEMENT | COMBINED FOCAL LENGTH |
|---|---|---|
| f1 | L1 TO L4 | 184.8 |
| f2 | L5, L6 | −71.6 |
| \|f1/f2\| | | 2.6 |

Example 2

Table 5 below shows data on lens surfaces that form a projection lens in Example 2.

TABLE 5

| SURFACE No. | LENS | GROUP | R | d | nd | μd |
|---|---|---|---|---|---|---|
| SC | | | INFINITY | OBJ | | |
| 1 | L1 | 1-1G | 291.53 | 8.71 | 1.8467 | 23.8 |
| 2 | | | −765.26 | 18.14 | | |
| 3 | L2 | 1-1G | 82.92 | 10.21 | 1.7440 | 44.9 |
| 4 | | | 325.21 | A | | |
| 5 | L3/4 | 1-2G | 242.28 | 7.98 | 1.4875 | 70.5 |
| 6 | | | −216.81 | 5.00 | 1.6200 | 36.3 |
| 7 | | | 86.63 | 6.28 | | |
| 8 | L5 | 2G | 260.28 | 3.20 | 1.6727 | 32.2 |
| 9 | | | 59.02 | 12.09 | | |
| 10 | L6 | 2G | −122.53 | 2.40 | 1.7283 | 28.3 |
| 11 | | | 176.14 | 0.65 | | |
| 12 | L7 | 2G | 112.70 | 4.28 | 1.8467 | 23.8 |
| 13 | | | 320.19 | B | | |
| 14 | L8 | 3G | 191.02 | 8.86 | 1.7725 | 49.6 |
| 15 | | | −171.24 | C | | |
| 16 | L9/10 | 4G | 129.52 | 9.75 | 1.4875 | 70.5 |
| 17 | | | −157.42 | 2.20 | 1.6889 | 31.2 |
| 18 | | | 58.92 | 2.83 | | |
| 19 | L11 | 4G | 60.73 | 9.59 | 1.7725 | 49.6 |
| 20 | | | 348.69 | D | | |
| 21 | L12 | 5G | −89.70 | 2.40 | 1.5481 | 45.8 |
| 22 | | | 103.85 | 24.96 | | |
| 23 | L13 | 5G | 507.26 | 8.65 | 1.4970 | 81.6 |
| 24 | | | −83.23 | E | | |
| 25 | L14 | 6G | 103.47 | 5.48 | 1.8467 | 23.8 |
| 26 | | | 401.61 | 5 | | |
| 27 | DP | | INFINITY | 50 | 1.5168 | 64.2 |
| 28 | | | INFINITY | 39.04 | | |
| PA | | | INFINITY | 0.00 | | |

Table 6 below shows zoom data for describing magnification changing action of the projection lens in Example 2 that operates in the wide-angle end setting and the telephoto end setting.

TABLE 6

| PARAMETER | WIDE | TELE |
|---|---|---|
| f | 165.2 | 231.1 |
| FNO | 2.0 | 2.6 |
| OBJ | 20 m | |
| EFFECTIVE IMAGE CIRCLE DIAMETER | φ44 | |
| ω (HALF ANGLE OF VIEW) | 7.6 | 5.4 |
| A | 3.47 | 3.47 |
| B | 48.3 | 2.04 |
| C | 1.00 | 14.09 |
| D | 33.24 | 31.75 |
| E | 16.37 | 51.04 |

Table 7 below shows data for describing focusing action of the projection lens in Example 2. Table 7 shows changes in the inter-group distance A associated with the first A group G1-1 in correspondence with a change in the distance to an object OBJ from 6 m to infinity and the movement range resulting from the change.

TABLE 7

| OBJ | A |
|---|---|
| 6 m | 4.18 |
| 20 m | 3.47 |
| INF | 3 |
| MOVEMENT RANGE | 1.18 |

Figure 4:
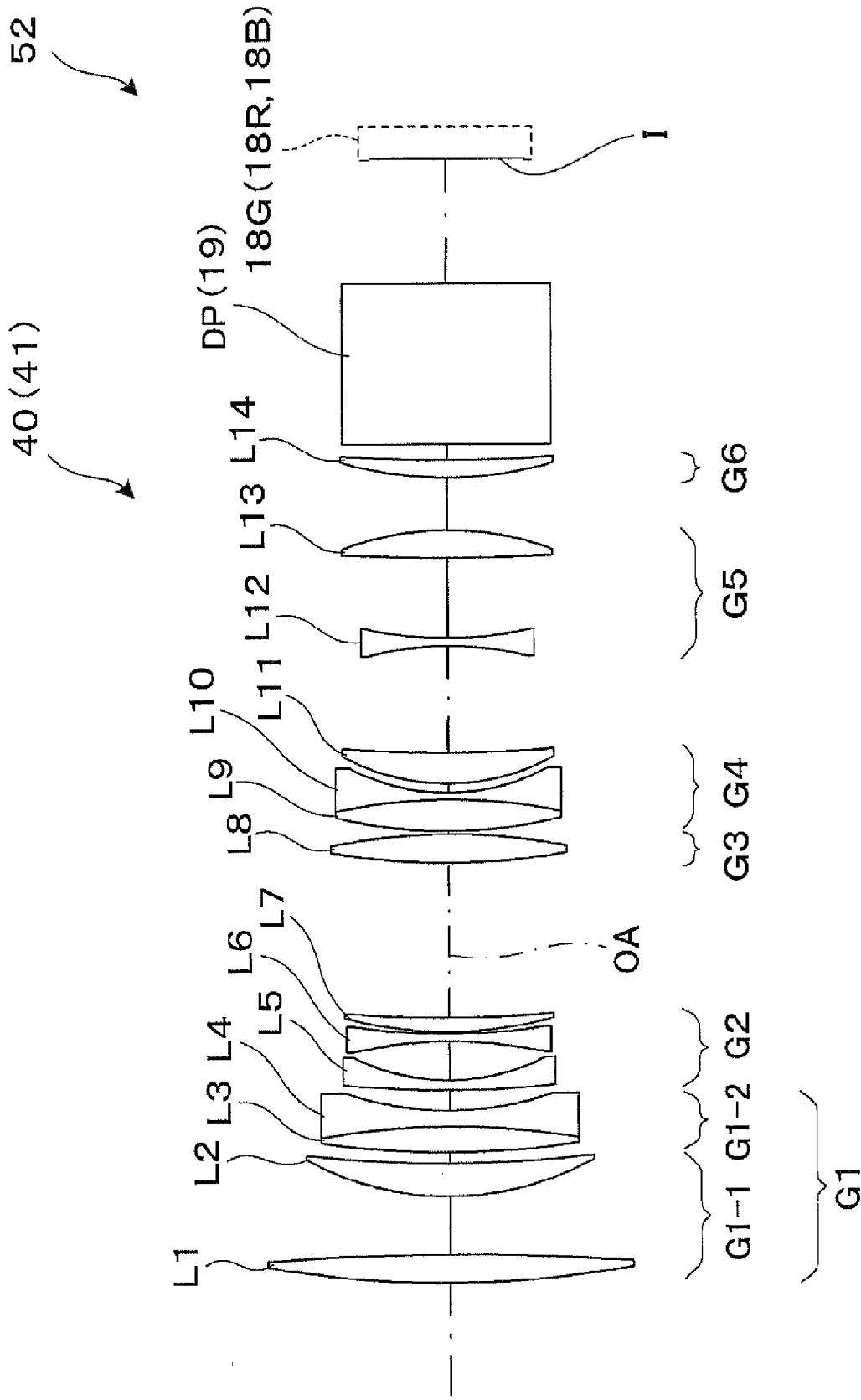
FIG. 4 is a cross-sectional view of a projection system in Example 2.

FIG. 4 is a cross-sectional view of a projection system including the projection lens and other components in Example 2. A projection lens 42 (or projection system 52) shown in FIG. 4 is formed of a first group G1 to a sixth group G6 sequentially arranged from the image enlargement side. Among the groups, the first group G1 includes a first A group G1-1 and a first B group G1-2 sequentially arranged from the image enlargement side. The first A group G1-1 includes a positive first lens L1 and a positive meniscus second lens L2, and the first B group G1-2 is a cemented lens formed of a positive third lens L3 and a negative fourth lens L4 cemented to each other. The second group G2 includes a negative meniscus fifth lens L5, a negative sixth lens L6, and a positive meniscus seventh lens L7. The third group G3, for example, includes a positive eighth lens L8. The fourth group G4, for example, includes a cemented lens formed of a positive ninth lens L9 and a negative tenth lens L10 and a positive meniscus eleventh lens L11. The fifth group G5, for example, includes a negative twelfth lens L12 and a positive thirteenth lens L13. The sixth group G6, which is closest to the image reduction side, includes a positive meniscus fourteenth lens L14. In magnification changing action, the third group G3 to the fifth group G5 are individually moved along the optical axis OA, and in focusing action, the first A group G1-1 on the image enlargement side is moved along the optical axis OA.

Figure 5A:
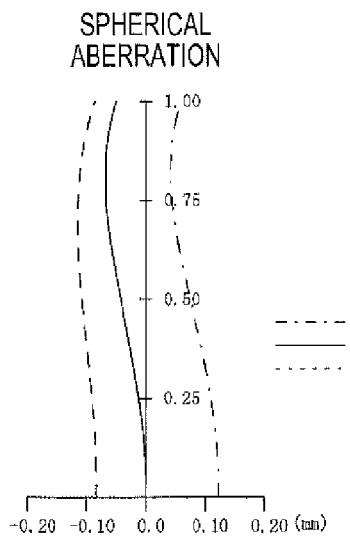
FIGS. 5A to 5F are aberration diagrams of the projection system in Example 2.
Figure 5B:
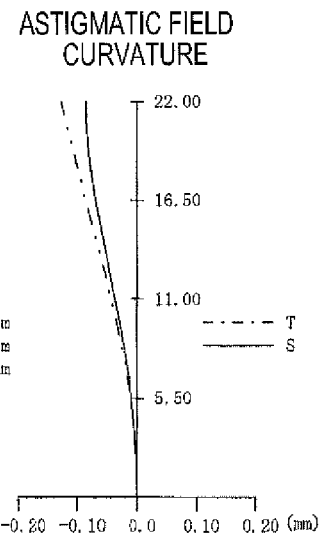
Figure 5C:
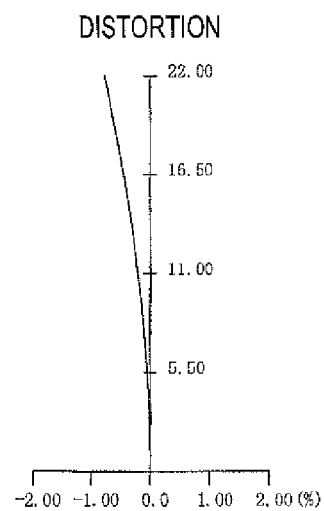
Figure 5D:
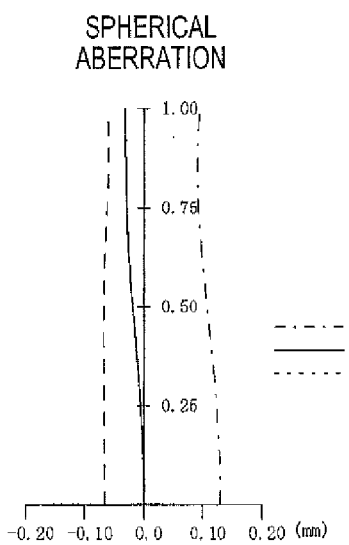
Figure 5E:
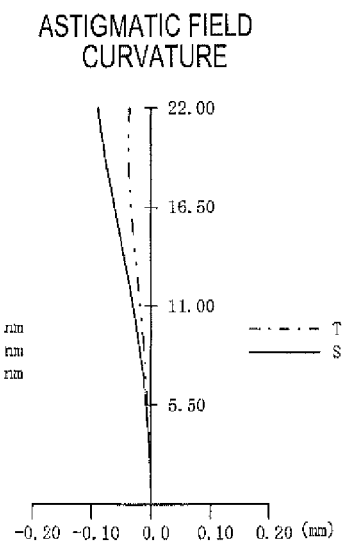
Figure 5F:
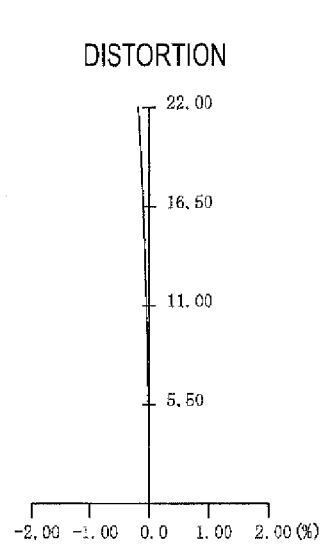

FIGS. 5A to 5C are aberration diagrams (spherical aberration, astigmatism, and distortion) at the wide-angle end (WIDE) of the projection lens 42 in Example 2, and FIGS. 5D to 5F are aberration diagrams (spherical aberration, astigmatism, and distortion) at the telephoto end (TELE) of the projection lens 42 in Example 2. The aberrations in FIGS. 5A to 5F are those produced when the distance to an object OBJ is 20 m.

Table 8 below shows numerical values (combined focal length) associated with the conditional expression (3) for the projection lens 42 in Example 2.

TABLE 8

| DEFINITION | CORRESPONDING ELEMENT | COMBINED FOCAL LENGTH |
|---|---|---|
| f1 | L1 TO L4 | 157 |
| f2 | L5 To L7 | −69 |
| \|f1/f2\| | | 2.3 |

Example 3

Table 9 below shows data on lens surfaces that form a projection lens in Example 3.

TABLE 9

| SURFACE No. | LENS | GROUP | R | d | nd | μd |
|---|---|---|---|---|---|---|
| SC | | | INFINITY | OBJ | | |
| 1 | L1 | 1-1G | 284.75 | 6.03 | 1.8467 | 23.8 |
| 2 | | | 5742.25 | 20.00 | | |
| 3 | L2 | 1-1G | 78.78 | 12.16 | 1.4875 | 70.5 |
| 4 | | | 561.47 | 0.20 | | |
| 5 | L3 | 1-1G | 82.44 | 7.40 | 1.4875 | 70.5 |
| 6 | | | 170.06 | A | | |
| 7 | L4/5 | 1-2G | 151.85 | 6.49 | 1.4875 | 70.5 |
| 8 | | | 994.95 | 3 | 1.6477 | 33.8 |
| 9 | | | 66.94 | B | | |
| 10 | L6 | 2G | −1210.71 | 2.9 | 1.6200 | 36.3 |
| 11 | | | 62.13 | 7.28 | | |
| 12 | L7 | 2G | −194.95 | 2.4 | 1.6200 | 36.3 |
| 13 | | | 117.70 | C | | |
| 14 | L8 | 3G | 131.84 | 6.34 | 1.8467 | 23.8 |
| 15 | | | 947.72 | D | | |
| 16 | L9 | 4G | 550.08 | 4.52 | 1.6584 | 50.9 |
| 17 | | | −424.05 | E | | |
| 18 | L10 | 5G | 217.02 | 7.33 | 1.4970 | 81.6 |
| 19 | | | −207.64 | 0.20 | | |
| 20 | L11/12 | 5G | 109.03 | 12.50 | 1.4970 | 81.6 |
| 21 | | | −96.89 | 2.50 | 1.6889 | 31.2 |
| 22 | | | 64.64 | 2.87 | | |
| 23 | L13 | 5G | 65.30 | 7.93 | 1.7440 | 44.9 |
| 24 | | | 217.98 | F | | |
| 25 | L14 | 6G | −216.54 | 3.20 | 1.6727 | 32.2 |
| 26 | | | 101.09 | 17.16 | | |
| 27 | L15 | 6G | −345.92 | 4.76 | 1.6584 | 50.9 |
| 28 | | | −118.62 | G | | |
| 29 | L16 | 7G | 89.15 | 6.59 | 1.8467 | 23.8 |
| 30 | | | 458.70 | 5 | | |
| 31 | DP | | INFINITY | 40 | 1.5168 | 64.2 |
| 32 | | | INFINITY | 31.12 | | |
| PA | | | INFINITY | 0 | | |

Table 10 below shows zoom data for describing magnification changing action of the projection lens in Example 3 that operates in the wide-angle end setting and the telephoto end setting.

TABLE 10

| PARAMETER | WIDE | TELE |
|---|---|---|
| f | 140.7 | 197.4 |
| FNO | 1.9 | 2.2 |
| OBJ | 17 m | |
| EFFECTIVE IMAGE CIRCLE DIAMETER | φ39 | |
| ω (HALF ANGLE OF VIEW) | 7.9 | 5.6 |
| A | 2.33 | 2.33 |
| B | 7.94 | 17.74 |
| C | 48.25 | 38.81 |
| D | 45.35 | 1.57 |
| E | 1.00 | 21.12 |
| F | 34.02 | 17.02 |
| G | 0.80 | 41.11 |

Table 11 below shows data for describing focusing action of the projection lens in Example 3. Table 11 shows changes in the inter-group distance A associated with the first A group G1-1 in correspondence with a change in the distance to an object OBJ from 9 m to 50 m and the movement range resulting from the change.

TABLE 11

| OBJ | A |
|---|---|
| 9 m | 2.79 |
| 17 m | 2.33 |
| 50 m | 2 |
| MOVEMENT RANGE | 0.79 |

Figure 6:
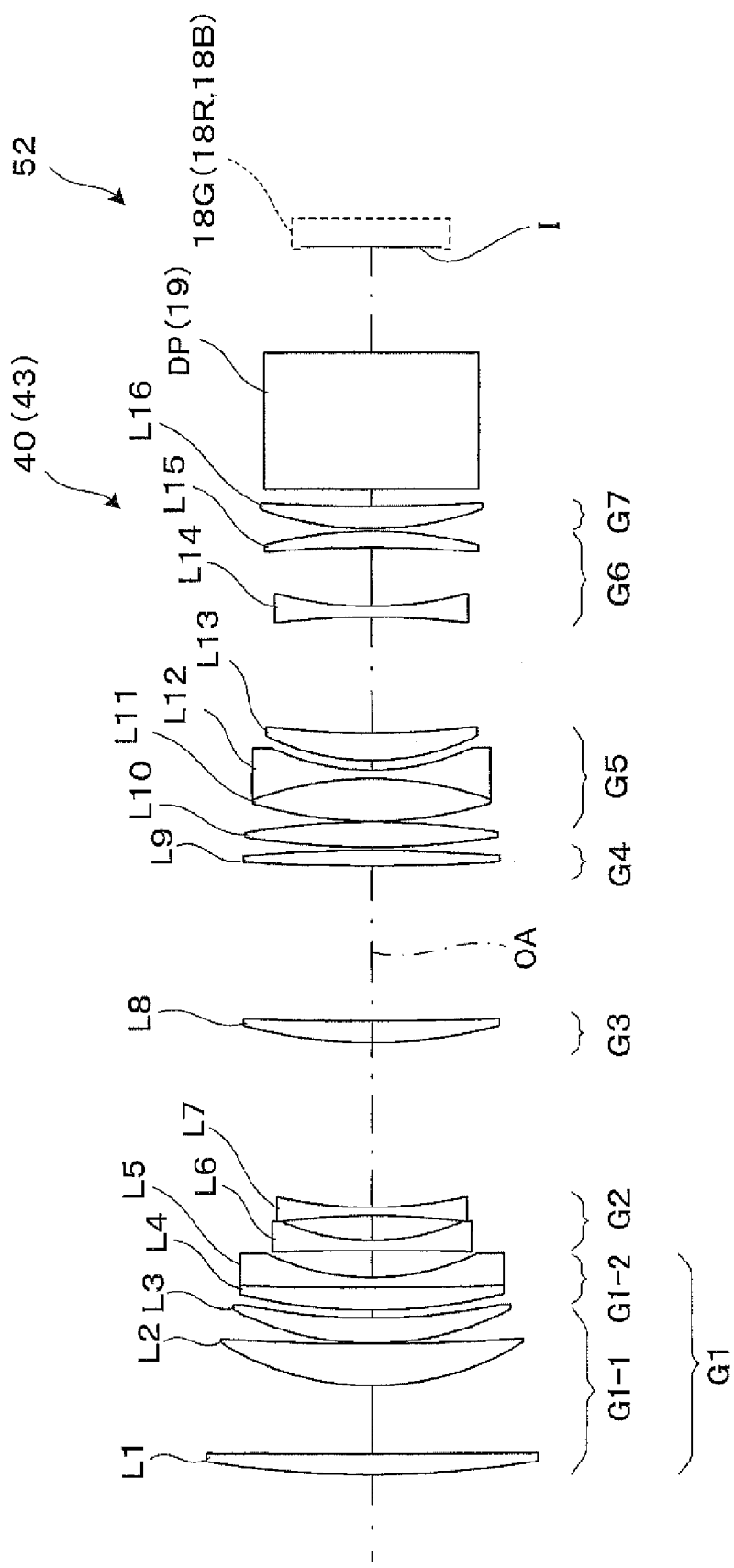
FIG. 6 is a cross-sectional view of a projection system in Example 3.

FIG. 6 is a cross-sectional view of a projection system including the projection lens and other components in Example 3. A projection lens 43 (or projection system 52) shown in FIG. 6 is formed of a first group G1 to a seventh group G7 sequentially arranged from the image enlargement side. Among the groups, the first group G1 includes a first A group G1-1 and a first B group G1-2 sequentially arranged from the image enlargement side. The first A group G1-1 includes a nearly plano-convex, positive first lens L1, a positive meniscus second lens L2, and a positive meniscus third lens L3, and the first B group G1-2 is a cemented lens formed of a positive meniscus fourth lens L4 and a negative meniscus fifth lens L5 cemented to each other. The second group G2 includes a negative sixth lens L6 and a negative seventh lens L7. The third group G3, for example, includes a positive meniscus eighth lens L8. The fourth group G4, for example, includes a positive ninth lens L9. The fifth group G5, for example, includes a positive tenth lens L10, a cemented lens formed of a positive eleventh lens L11 and a negative twelfth lens L12, and a positive meniscus thirteenth lens L13. The sixth group G6 includes a negative fourteenth lens 114 and a positive meniscus fifteenth lens L15. The seventh group G7, which is closest to the image reduction side, includes a positive meniscus sixteenth lens L16. In magnification changing action, the second group G2 to the sixth group G6 are individually moved along the optical axis OA, and in focusing action, the first A group G1-1 on the image enlargement side is moved along the optical axis OA.

Figure 7A:
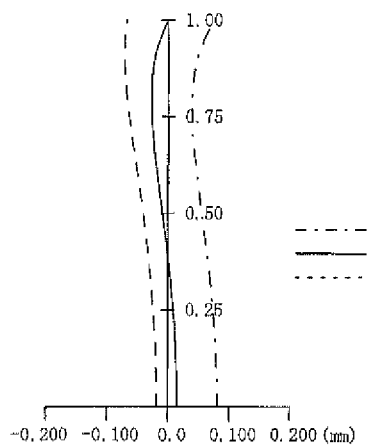
FIGS. 7A to 7F are aberration diagrams of the projection system in Example 3.
Figure 7B:
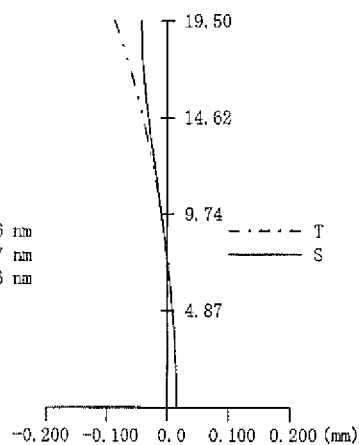
Figure 7C:
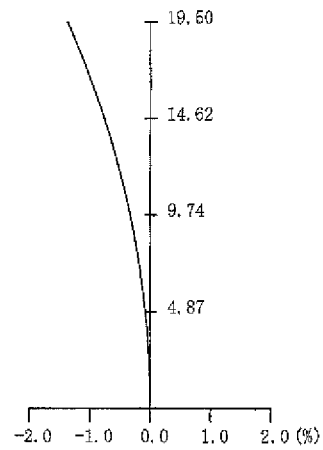
Figure 7D:
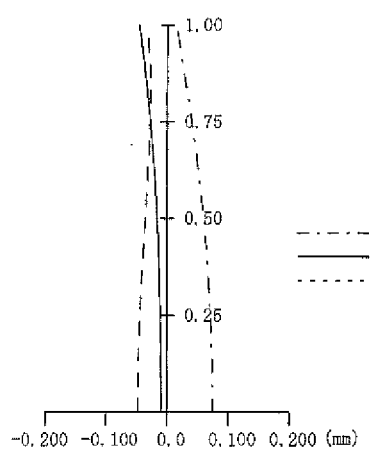
Figure 7E:
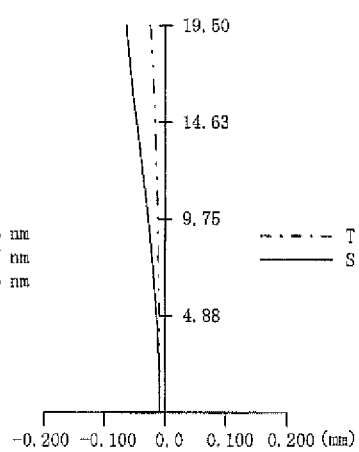
Figure 7F:
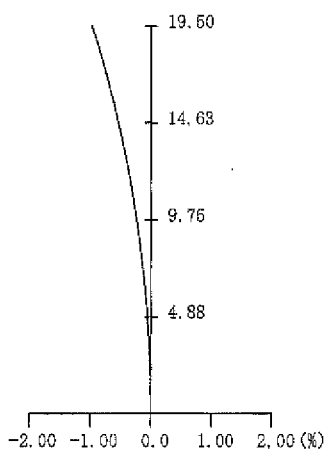

FIGS. 7A to 70 are aberration diagrams (spherical aberration, astigmatism, and distortion) at the wide-angle end (WIDE) of the projection lens 43 in Example 3, and FIGS. 7D to 7F are aberration diagrams (spherical aberration, astigmatism, and distortion) at the telephoto end (TELE) of the projection lens 43 in Example 3. The aberrations in FIGS. 7A to 7F are those produced when the distance to an object OBJ is 17 m.

Table 12 below shows numerical values (combined focal length) associated with the conditional expression (3) for the projection lens 43 in Example 3.

TABLE 12

| DEFINITION | CORRESONDING ELEMENT | COMBINED FOCAL LENGTH |
|---|---|---|
| f1 | L1 TO L5 | 152.1 |
| f2 | L6, L7 | −50.7 |
| |f1/f2| | | 3.0 |

Outline of Examples

Table 13 below summarizes numerical data on the value vd1-vd2 and other values in the conditional expressions (1) to (3) in Examples 1 to 3.

TABLE 13

| Conditional Expression | Example 1 | Example 2 | Example 3 |
|---|---|---|---|
| 25 < (vd1 − vd2) < 50 | 24.7 | 34.2 | 36.7 |
| 25 < vd < 50 | 32.2 | 32.2 | 36.3 |
| 1.5 < \|f1/f2\| < 4 | 2.6 | 2.3 | 3 |

The invention is not limited to the embodiment and the examples described above and can be implemented in a variety of aspects to the extent that the aspects do not depart from the substance of the invention.

For example, in each of Examples 1 to 3, one or more lenses having substantially no power can be added in positions upstream or downstream of the lenses L1 to L16 or therebetween.

Further, an object to be enlarged and projected through the projection lens 40 is not limited to the liquid crystal panel 18G, 18R, or 18E, and images formed by a variety of light modulation devices, such as a digital micromirror device having pixels in the form of micromirrors, can be enlarged and projected through the projection lens 40.

The entire disclosure of Japanese Patent Application No. 2014-006457, filed on Jan. 17, 2014 is expressly incorporated by reference herein.

What is claimed is:

1. A projection system comprising:
    a first group to an N-th group sequentially provided from an image enlargement side,
    wherein N is 6 or 7,
    the first group is formed of a first A group formed of two or three positive lenses and a first B group formed of a cemented lens formed of a positive lens and a negative lens and provided in a position adjacent to the second group,
    the second group includes at least two negative lenses,
    in focusing action, the first A group is moved along an optical axis, and
    in magnification changing action, at least the first group and the N-th group are fixed and at least the third group to the (N−1)-th group are moved along the optical axis.

2. The projection system according to claim 1,
    wherein in the magnification changing action, the second group to the (N−1)-th group are moved along the optical axis.

3. A projection-type image display apparatus comprising:
    the projection system according to claim 2; and
    an image forming optical section provided in an optical path of the projection system in a position upstream thereof.

4. The projection system according to claim 1,
    wherein in the Magnification changing action, the first group, the second group, and the N-th group are fixed.

5. A projection-type image display apparatus comprising:
    the projection system according to claim 4; and
    an image forming optical section provided in an optical path of the projection system in a position upstream thereof.

6. The projection system according to claim 1,
    wherein assuming about the lenses in the first group that the positive lens of the cemented lens present in the first B group has an Abbe number vd1 and the negative lens of the cemented lens has an Abbe number vd2, the following conditional expression is satisfied:

$$25<(vd1-vd2)<50.$$

7. A projection-type image display apparatus comprising:
    the projection system according to claim 6; and
    an image forming optical section provided in an optical path of the projection system in a position upstream thereof.

8. The projection system according to claim 1,
    wherein assuming that the second group includes a plurality of negative lenses including the two negative lenses; one of the plurality of negative lenses is a biconcave lens; and among the plurality of negative lenses present in the second group, the negative lens located in a position closest to the image enlargement side has an Abbe number vd, the following conditional expression is satisfied:

$$25<vd<50.$$

9. A projection-type image display apparatus comprising:
    the projection system according to claim 8; and
    an image forming optical section provided in an optical path of the projection system in a position upstream thereof.

10. The projection system according to claim 1,
    wherein assuming that the focal length of the combination of the first A group and the first B group is f1 and the focal length of the second group is f2, the following conditional expression is satisfied:

$$1.5<|f1/f2|<4.$$

11. A projection-type image display apparatus comprising:
    the projection system according to claim 10; and
    an image forming optical section provided in an optical path of the projection system in a position upstream thereof.

12. A projection-type image display apparatus comprising:
    the projection system according to claim 1; and
    an image forming optical section provided in an optical path of the projection system in a position upstream thereof.

* * * * *